INVENTORS
ADRIAN O. ABBOTT, JR. &
CHERI M. SLOMAN
BY
THEIR ATTORNEY

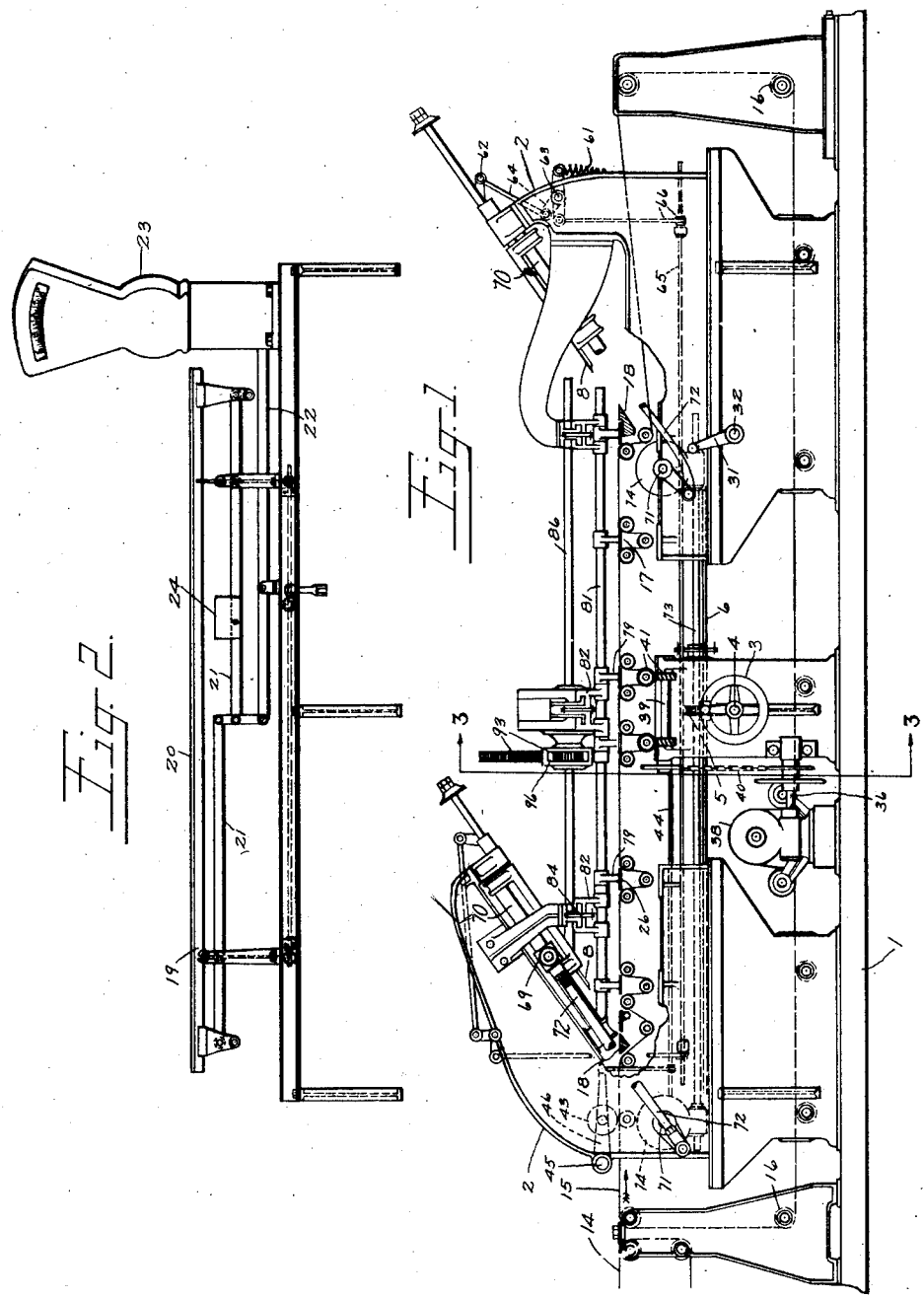

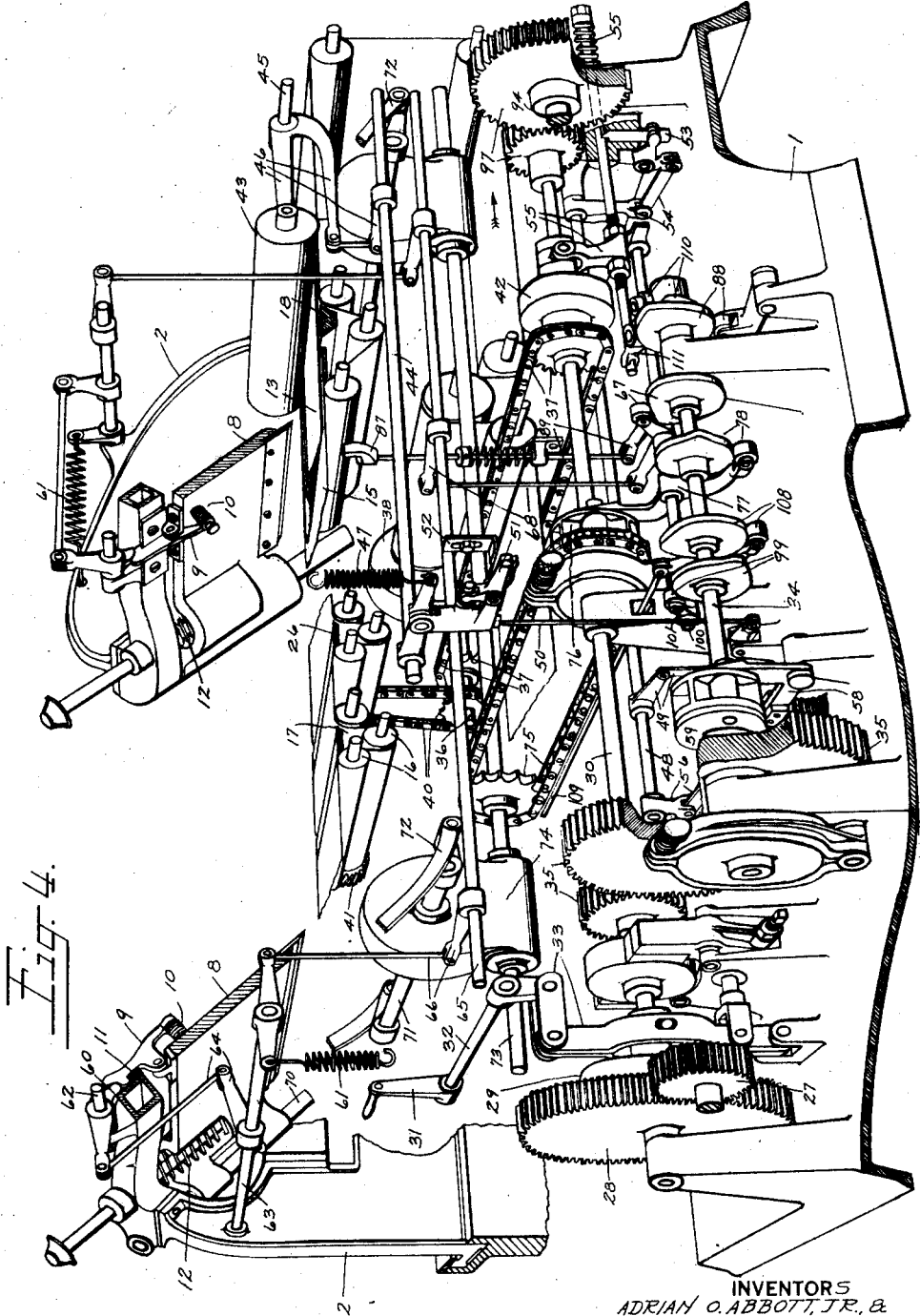

May 1, 1928.
A. O. ABBOTT, JR., ET AL
1,668,038
MACHINE FOR CUTTING AND WEIGHING STRIP MATERIAL
Filed Oct. 24, 1923     4 Sheets-Sheet 4
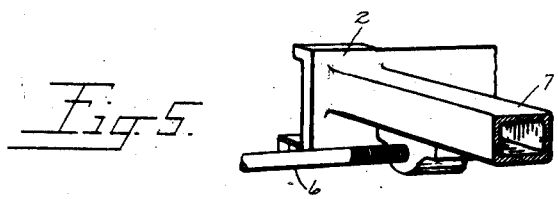
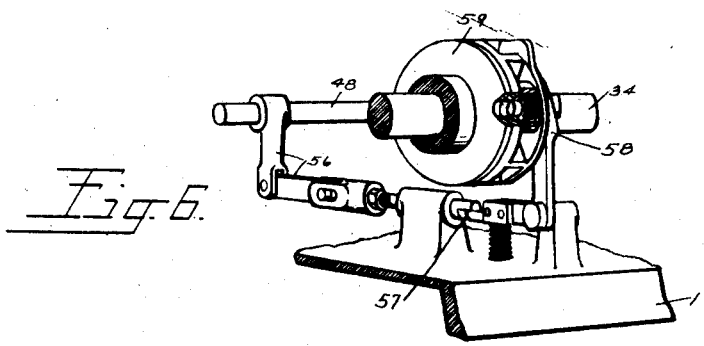
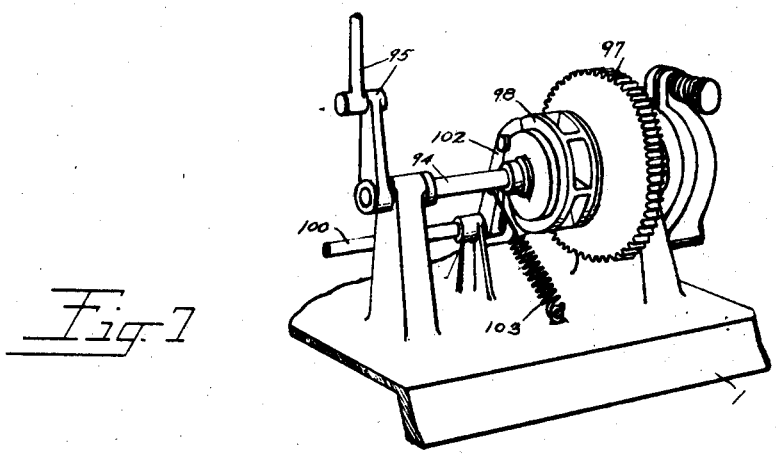
INVENTORS
ADRIAN O. ABBOTT JR,
& CHERI M. SLOMAN.
BY
THEIR ATTORNEY Patented May 1, 1928.

1,668,038

UNITED STATES PATENT OFFICE.

ADRIAN O. ABBOTT, JR., AND CHERI M. SLOMAN, OF DETROIT, MICHIGAN, ASSIGNORS TO MORGAN & WRIGHT, OF DETROIT, MICHIGAN, A CORPORATION OF MICHIGAN.

MACHINE FOR CUTTING AND WEIGHING STRIP MATERIAL.

Application filed October 24, 1923. Serial No. 670,434.

This invention relates more particularly to a machine for producing strips of material, such for instance, as strips of plastic material used in the manufacture of tires, wherein are provided means for cutting the strip of plastic or other material to a definite length and thereafter weighing it.

The machine in its preferred embodiment is devised to first cut and then weigh the strip. It is, however, within the scope of the invention to provide the machine with only one of these features, as for instance the cutting feature, or if desired to utilize the machine as a weighing machine and instead of the cutting feature the strips may be otherwise treated as desired before being conveyed to the weighing device. The following description will be directed to the preferred embodiment including both the cutting and weighing features, and it will be easily discernible from this, which of the features may be eliminated to adopt the machine to serve as a cutting machine only or as a weighing machine, as may be desired.

In the preferred embodiment, the machine includes means for cutting the strip of material, comprising a pair of cutters; means for weighing the cut strip, comprising a scale; means for conveying the material to the cutters, comprising an endless conveyor; and means for conveying the cut strip from the endless conveyor to the scale, comprising a series of reciprocatory supporting arms.

The machine further comprises a main frame upon which most of the mechanism, the weighing scale and the two conveyors are supported, and two adjustable auxiliary frames upon which the two cutters, with their attendant mechanisms, are respectively supported. The auxiliary frames are mounted on the main frame in a manner to permit relative movement therewith, and means are provided for moving the auxiliary frames toward and away from each other as desired to set the cutters at a predetermined distance apart to cut the required length of material, which in the case of tire tread material, for instance, permits the machine to be used for cutting treads for tires of various sizes.

In the operation of the machine the several parts briefly referred to operate in the following manner and sequence:—The endless conveyor receives the strip of material from another conveyor or other source of supply, and carries it along the machine until its respective ends reach positions beneath the two cutters in readiness to be cut. The cutters are preferably of the nature of guillotine knives, spring actuated during their cutting action. As soon as the material has reached the desired position beneath the two knives the travel of the endless conveyor is automatically arrested, and the knives are permitted to drop, with the help of the springs, upon the material with sufficient impetus to cut the strip entirely across near its two ends, thereby producing a piece between the cutters of a predetermined length and of the entire width of the strip. The knives are then returned to their inactive positions above the endless conveyor, and the conveyor arms are operated to convey the cut strip from the endless conveyor to the scale where the piece is weighed and thereafter finally removed, the arms first returning to their initial positions. The conveyor belt is then once more set into motion and the cycle of operations repeated, whereby another strip is cut and weighed. The starting and stopping of the machine is under the control of the operator but once started, is continuous and automatic in its operations until stopped by the operator, the only requirements being to feed the material to the machine and to take away the weighed strips from the scale, the former in the present instance being accomplished by means of a conveyor, and the latter by hand.

Referring more particularly to the drawings forming a part of this specification:—

Fig. 1 is a front elevation, more or less diagrammatical, partly in section and partly broken away, of certain of the important features of the machine.

Fig. 2 is a front elevation of the weighing scale which is positioned at the front of the machine but is omitted for convenience from the view shown in Fig. 1.

Fig. 4 is an enlarged rear view in perspective of the machine partly in section and partly broken away showing various controlling features;

Fig. 5 is an enlarged view in perspective showing the adjusting-screw attachment for the knife carrying auxiliary frames;

Fig. 6 is an enlarged view in perspective showing the mechanism which is employed in operating the knife lifting devices; and Fig. 7 is an enlarged view in perspective showing the mechanism employed in operating the conveyor arms.

Figure 3:
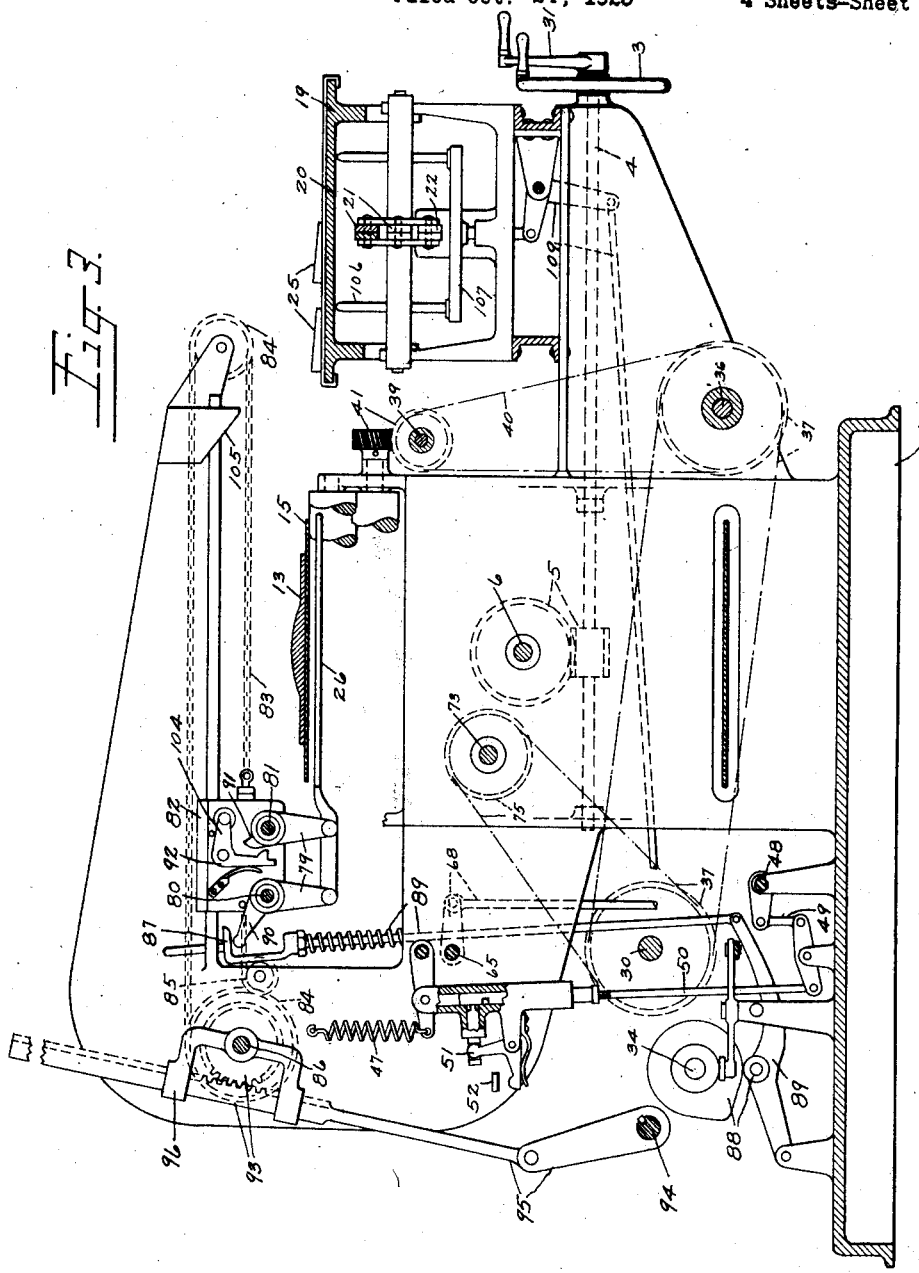
Fig. 3 is an enlarged sectional elevation on the line 3—3 of Fig. 1, viewed arrow-wise, showing the scale in connection with the machine proper.

Upon the main frame 1 of the machine are slidably mounted the knife-supporting auxiliary frames 2—2. These frames with their supported knives and certain of their operating mechanism, which will later be described, are moved simultaneously toward or away from each other as the case may require to suitably vary the space between the knives so that a strip of predetermined length may be cut, by means of a hand wheel 3 secured at the front of the machine upon the outer end of a transverse shaft 4, operably connected, by the worm gears 5, to a longitudinal shaft 6, both shafts being suitably journalled in the main frame 1. The shaft 6 is provided at its opposite ends with right and left threaded screws which engage similarly threaded apertures formed in the cross bars 7 forming part of the frames 2 (see Fig. 5). It will thus be apparent that by turning the hand wheel 3 in the proper direction the frames and their supporting knives may be adjusted in suitable spaced relation to cut a strip of the desired length.

The knives and controlling mechanism supported by each of the frames 2 are substantially similar in character and function, the slight differences existing being simply for convenience of arrangement. It is therefore believed that a general description will suffice for both and that the mere difference in arrangement of the parts will be apparent from the drawings without any special reference thereto. The two knives 8 are slidably mounted in their respective frames to permit them to move up and down, and each is held in raised position by a latch 9, which, by means of a spring 10, automatically engages a latch member 11 secured on the frame, when the knife is raised thereby holding it in raised position. Each of the knives is provided with a pair of springs 12 which are compressed as the knife is being raised, and which react when the latch 9 is released, to force the knife downward with sufficient impetus to cut the strip throughout its entire cross-sectional area. In forming treads for tires the knives are preferably set at an angle so that the strip may be cut with bevel ends for forming a lap joint when they are brought together to form the tread.

The strip material which is shown in the present instance to represent a strip 13 of unvulcanized rubber compound suitably shaped in cross-section for use in forming treads of pneumatic tires, is preferably fed to the machine by a conveyor belt 14 from any source of supply. This belt feeds the material to the endless conveyor 15 which passes about a series of guide rollers 16 some of which are mounted in the main frame 1 to guide and direct the belt in the desired path and to maintain a uniform tension therein, and others of which are mounted in the auxiliary frames 2 and main frame 1 to further guide and direct the belt and in addition thereto to divert the upper run at certain points to produce thereby a series of transversely directed gaps 17 across the path of the traveling material. These gaps are adapted to receive the series of conveyor arms before referred to and which will later be more fully described, and gaps formed by the guide rollers secured in each of the frames 2 are positioned in the path of the respective knives to form recesses for the cutting blocks 18 which are secured at their ends to the frames 2 and which have one of their faces disposed to form a shearing surface against which the respective knives act in cutting the strip. It will be observed that the frames 2 may be moved along the main frame 1 as already described together with the shearing blocks 18 and guide rolls 16 supported in the frames without in any way disturbing the tension of the endless conveyor 15.

At the front of the machine is a weighing scale 19 which receives and weighs the strip after it has been cut. The scale may be of any usual or preferred construction and in the present instance comprises the platform 20 supported on beams 21 in the usual manner and connected, through a lever 22, to the usual indicating mechanism 23. The scale is balanced by a weight 24 slidably mounted on one of the beams 21. A series of spaced blocks 25 is secured upon the platform 20 for receiving the strip of cut material.

The strip is conveyed from the endless conveyor 15 to the scale by means of a series of conveyor arms 26 which have already been referred to and which when in inactive positions, are disposed in the gaps 17, and means which will later be described, are provided for slightly raising the arms to bring them into contact with and to slightly raise the cut strip to clear the endless conveyor 15 and to then carry the strip to and deposit it upon the blocks 25 on the scale. On reaching the scale the arms 26 enter the spaces between the blocks 25, and are then lowered to deposit the strip upon the blocks and to free themselves therefrom, whereupon they return to their original inactive positions in the gaps 17. The blocks, as is obvious, permit the arms 26 to be lowered and withdrawn without carrying the strip with them, and to better accomplish this the blocks are slightly inclined away from the direction of the return travel of the arms thereby offering resistance to displacement of the strip. After the strip is weighed it is removed by hand.

The machine may be driven by any desired source of power and in the present instance a gear wheel 27 is mounted in the frame 1, to be driven by this power. This wheel is geared to a wheel 28 which is mounted upon, and drives, through the clutch 29, the main shaft 30 of the machine. The clutch 29 is entirely under the control of the operator through means of a hand lever or crank 31 positioned at the front of the machine upon a transverse shaft 32 which is connected to the clutch through the connections 33 so that by the operator simply turning the hand lever 31 in the appropriate direction the machine may be set in operation or stopped at will, the several parts being supported by the main frame 1.

In the following description it will be understood that the various parts referred to, unless otherwise stated, are supported by the main frame 1, and no further reference will be made thereto. The various operations in greater detail than has previously been mentioned are (presuming the knives are in raised positions):—first, driving the conveyor belt 15 until a strip of material has been fed beneath the knives; second, arresting the travel of the conveyor belt; third, simultaneously dropping the knives to cut the strip; fourth, moving the conveyor arms 26 to carry the cut strip over to the scale; and fifth, returning the conveyor arms to their inactive positions. This is the sequence of the main operations of the machine. There are one or two other operations which will be referred to later. These operations in the main are controlled by a series of cams (later to be described) mounted on a cam-shaft 34. This shaft is driven by the main shaft 30 through the train of intermeshing gears 35.

The conveyor belt 15 is driven from shaft 30 through means of a countershaft 36 connected to the drive shaft 30 by the sprocket-wheel-and-chain connections 37. This countershaft drives one of the rollers 16 by means of the pair of worm gears 38 mounted respectively on the shaft of the roller and on the countershaft. Two other rollers of the series of rollers 16 are likewise positively driven from the countershaft 36 by means of an intermediate shaft 39 which is connected to the countershaft 36 by sprocket-wheel-and-chain connections 40 and which is connected to the two mentioned rollers by spiral-gear connections 41. The sprocket wheel on the main shaft 30 of the connections 37 is connected with a clutch 42 and is normally in driving relation therethrough with the shaft 30 but is disconnected therefrom at certain intervals as will later appear.

It will thus be seen that when the operator sets the clutch 29 to drive the main shaft 30 the conveyor belt will at once begin to travel. The strip of material coming from the conveyor 14 will move upon the conveyor belt 15 and travel in unison therewith in the direction of the arrows (see Figs. 1 and 4). A roller 43 mounted above the upper run of the conveyor belt 15 is connected to a longitudinal rocker shaft 44 through a transverse shaft 45 and arm-and-link connections 46 whereby a raising and lowering of the roller 43 will rock the shaft 44 in opposite directions. The raising and lowering of the roller 43 is dependent upon the movement of the conveyor belt 15 and the timing thereof is dependent upon the position of the strip material relative to the knives. Subject to the just mentioned restrictions, the control of the roller 43 may be accomplished in various ways. In the present instance, however, the material is fed to the machine in strips of slightly greater lengths than are required and after the strip is cut to definite length and weighed the ends that remain travel along the conveyor and fall off at the end where they are collected to be remilled for further use as may be desired. This oversized strip is utilized for raising and lowering the roller 43, the roller being raised by the strip as soon as its forward end is fed thereunder and being lowered as soon as the opposite end of the strip passes the roller. The lowering of the roller and rocking of the shaft 44 produced thereby is enhanced and made more positive by a spring 47 anchored at its upper end to the frame 1 and connected at its lower end to the shaft 44, by means of an arm connection.

The rocking of shaft 44 produces a rocking of shaft 48 through means of arm-and-link connections 49 and rod connection 50. The rod 50 is formed of telescoping sections, the lower one being provided with a notch and adapted to slide within the upper one, and the upper section being provided with a latch 51 which is spring pressed to automatically engage the notch in the lower section when brought to registering position therewith as the upper section is moved downward relatively to the lower section. The several connections mentioned are so arranged, as will be obvious from an inspection of the drawings that, as the roller 43 is raised when the front end of the strip passes therebeneath, the upper section of the rod 50 will be lowered, thereby moving relatively to the lower section until the latch 51 when brought to register with the notch of the lower section automatically engages therewith, thereby locking the two sections together. The strip continues to move with the conveyor and finally reaches a position beneath the two knives ready to be cut.

When the strip is so positioned ready to be cut, it is then necessary to arrest the movement of the conveyor 15. In this position of the strip it has entirely passed the roller 43 thereby permitting the roller to drop which effects a raising of the rod 50 and a corresponding rocking of the shaft 48 in one direction. As the rod is raised the latch 51 strikes a stop 52 which operates to withdraw the latch from the notch permitting the lower section to drop and the shaft 48 to rock in the opposite direction.

As the shaft 48 is first rocked by the lifting of the lower section of the rod 50 it retracts or lowers a pin 53 connected to the shaft by means of an arm-link-and-bellcrank connection 54. This releases the rod spring-and-clutch connection 55 and permits the spring of connection 55 to operate the clutch 42 to free the sprocket-chain-and-wheel drive 37 from driving engagement with the main shaft 30 thereby arresting the movement of the conveyor belt 15. As the shaft 48 rocks as above described it also, through arm-and-link connections 56, releases a latch 57 thereby releasing clutch stop 58 permitting clutch 59 to connect the cam-shaft 34 with gear 35. This cam-shaft 34 carries the several cams as has been previously stated and these control the subsequent operations of the machine. It will thus be seen, that by the coming of the strip into contact with roller 43 mechanism is set for operation, and that upon the strip leaving the roller the mechanism is set into operation, whereby the motion of the conveyor belt 15 is arrested with the strip in position to be cut, and whereby the cam-shaft 34 is rotated for carrying out the further operations. These operations are effected by one revolution of the shaft 34 during which time the latch 57 is being reset which is accomplished by a cam formed on the clutch 59 as clearly shown in Fig. 6. This cam comes into engagement with the horizontal arm of the bell-crank-shaped clutch stop 58 and forces it down into its initial position where it is engaged by the latch member 57 which is controlled by the connections 56.

When the movement of the conveyor belt 15 has been arrested as has just been described the knives 8 are in raised positions (as will later more fully appear) ready to be dropped to cut the strip. A releasing finger 60 is disposed in front of each of the latches 9 in a manner to engage the latch, when positively swung outwardly, to release it from the latch member 11 thereby leaving the knives free to fall under the force of the compressed springs 12 which produce sufficient impetus to entirely sever the strip throughout its cross-sectional area. Each knife during its cutting action co-operates with its corresponding shearing block 18 as has already been described. The finger 60 is normally held away from its latch by a spring 61 connected to the finger by means of a shaft 62 upon which the finger is mounted, a shaft 63, and arm-and-link connections 64, all of which parts are supported upon the auxiliary frame 2, the spring 61 being anchored at one end to the frame 2 and at its other end to the shaft 63 through an arm connection. It will thus be seen, that the spring 61 will both hold the finger from engagement with the latch and return it to this position when permitted so to do after engagement, and that to release the latch the shaft 63 must be rocked in a direction against the pull of the spring, the arm-and-link connections 64 being suitably arranged so that such rocking of the shaft 63 will swing the finger outward to thereby release the latch.

The shafts 63 are in operable connection with a longitudinal shaft 65 by arm-and-link connections 66, the arms connected to the shaft 65 being slidably mounted thereon so that they may be moved along the shaft when the auxiliary frames 2 are moved along the frame 1 to set the knives at the proper distance apart as has already been described. Shaft 65 is rocked by means of the cam-wheel-and-roller drive 67, the cam-wheel being mounted on cam shaft 34 and the roller being connected to the shaft 65 by means of arm-link-and-lever connection 68 whereby a rotation of the cam wheel will effect an oscillation of the shaft 65 and a simultaneous releasing of the two latches 9, after which the latch releasing and operating parts automatically return to their previous positions.

The knives, having thus been released to permit them to operate to cut the respective ends of the strip due to the impetus produced in their descent by the recoil of the compressed springs 12, are next raised to their inactive positions, the latches 9 being automatically locked to hold the knives in these positions. To raise the respective knives, slides 69 (see Fig. 1) are mounted on rods or guides 70 secured to the frame 2, in a manner to be raised and lowered, the upward movement being adapted to raise the knife to a sufficient extent to permit the latch 9 to be automatically locked, at the same time compressing the spring 12, and the downward movement being effected independently of the knife, the slides coming finally to rest at a point out of reach of the knife when it falls so that its cutting action will not be interfered with.

The sliding members 69 are connected to a transverse shaft 71 by means of arm-and-link connections 72, these several parts being carried by the auxiliary frame 2. The shaft 71 is connected to a longitudinal shaft 73 by means of worm gears 74 the gear mounted on shaft 73 being adapted to slide thereon to permit adjustments of the frames 2 as has already been described. It will thus be seen that by a half rotation of shaft 73 in the proper direction the knives will be raised and that during the other half of the rotation the slides 69 will be lowered to their inactive positions.

Shaft 73 is connected to main drive shaft 30 by means of the sprocket-wheel-and-chain connections 75. The sprocket-wheel of the connections 75 that is mounted on the main shaft 30 is connected thereto through the releasing of a clutch 76 which is released by the releasing mechanism 77, controlled by the cam-wheel-and-roller-mechanism 78, the cam-wheel being secured to cam-shaft 34 and the roller being secured to an arm forming part of the releasing mechanism 77. This cam-wheel as well as the other cam-wheels of the machine that operate the various clutches are made to release their respective rollers in the usual manner at the proper time to disengage their respective clutches when the desired operation dependent upon them has been completed. The operation of the cam-wheel-and-roller mechanism 78 is so timed that after the knives have cut the strip they will be raised to their inactive positions.

The next operation is to transfer the cut strip from the conveyor 15 to the scale platform 20. This is accomplished, as already stated, by the series of conveyor arms 26 which are when in inactive positions disposed in the gaps 17 beneath the strip of material. The arms 26 are first moved upwardly to contact with the cut strip and then to raise it free from the conveyor belt. They are then moved over to the platform 20 conveying the strip with them. The arms are next lowered between the spaced blocks 25 first depositing the strip upon the blocks, and then descending further to free themselves from the strip, and lastly they are moved back to their original inactive positions in the gaps 17. To effect these various movements the arms 26 (six being used in the present embodiment) are each pivotally secured at their rear ends to pairs of depending arms 79, the rear arms of the pairs being mounted on a shaft 80 and the front arms of the pairs being mounted on a shaft 81. The shafts 80 and 81 are mounted in blocks 82, three being employed in the present embodiment, the end blocks being mounted on the auxiliary frames 2—2, and the central block being mounted on the main frame 1, to slide transversely relatively thereto. Each block is secured to a sprocket chain 83, which is passed around a pair of sprocket wheels 84, a third sprocket wheel 85 being conveniently employed to support the lower run of the chain in a horizontal position. The rear sprocket wheels of the pairs 84 are mounted on a shaft 86 which is mounted at its end in the two auxiliary frames 2—2 and at its center in the frame 1. The pairs of arms 79 supporting the two arms 26 at each end of the series of these arms are mounted for sliding upon their respective shafts 80—81. The shafts 80—81 are likewise mounted for sliding in the end blocks 82, and the shaft 86 is mounted to slide in the auxiliary frames 2, the slidable mountings of these parts being essential in order to permit an adjustment of the knives by movement of the auxiliary frames as has already been described.

It will be observed from a consideration of the mechanism just described that by a swinging of the arms 79 anticlockwise as viewed in Fig. 3, the arms 26 will be raised thereby raising the strip free from the conveyor belt 15; that by a driving of the sprocket chains 83, so that the lower runs will advance, the arms with the supported strip will be moved over to the scale platform 20; that by swinging the arms 79 clockwise the arms 26 will be lowered thereby first depositing the strip upon the blocks 25 and then freeing themselves from the strip; and that finally by reversing the motion of the chains 83 the arms 26 will be returned to their original positions. The first of these movements, namely the raising of the arms 26, is accomplished by a positive rocking of shaft 80 effected by a hooked finger 87 operably connected to a cam-wheel-and-roller drive 88 by means of a rod-spring-and-lever connection 89; the cam-wheel of the drive 88 being mounted on cam-shaft 34, and the roller being mounted on the lever of connection 89. This cam-wheel is timed to effect a lowering of the hooked finger 87 when the knives have returned to their inactive positions. The finger in its downward movement engages and swings an arm 90 secured on shaft 80 thereby rocking this shaft which effects a raising of the arms 26. This movement also simultaneously rocks the shaft 81 and a lug 91 secured on this shaft automatically engages a spring pressed latch 92 pivotally mounted on the central block of the series of blocks 82, when the arms 26 have been moved to their raised positions. This locks the arms 26 in their raised positions, after which the hooked finger 87 automatically returns to its raised inactive position due to the recoil of the spring of the connection 89 that had been previously compressed by the downward movement of the finger.

The sprocket chains 83 are next driven to convey the strips supported on the arms 26 over to the scale platform 20. This is effected by means of the gear-wheel-and-rack drive 93, the gear wheel being secured on shaft 86, and the rack being operably connected to a shaft 94 by rod-and-arm connection 95; the rack being formed on the rod of connection 95, and slidably mounted in a guide 96 freely mounted on shaft 86, and the arm being secured on shaft 94. Shaft 94 is connected to main shaft 30 by the pair of intermeshing gears 97 mounted respectively on the two shafts, a clutch 98 being secured to the gear wheel mounted on shaft 94. This clutch is operated to connect its gear with the shaft 94 by means of cam-wheel-and-roller control 99, the cam-wheel being secured on cam-shaft 34 and the roller being secured to a shaft 100 by means of an arm 101, the said shaft having also mounted thereon the clutch releasing arm 102, the cam-wheel and roller of control 99 being held together in spring pressed engagement and the releasing arm 102 being held in spring pressed engagement with the clutch 98, by means of the spring 103. The shaft 100 is sufficiently rocked by the coaction of the cam-wheel and the roller, of drive 99 to release the clutch 98 thereby placing the shaft 94 in operative connection, through the gears 97 with the main shaft 30. The shaft 94 is thus rotated which causes the gear-wheel-and-rack drive 93 through its connection 95 with the shaft 94 to drive the chains 83 thereby conveying the cut strip to the scale platform. This is timed to take place as soon as the arm 26 has been raised as has been previously described.

The cut strip having now been conveyed to the scale platform the next step is to deposit it on the blocks 25. This is effected by returning the arms 79 to their former positions thereby lowering the arms 26. To accomplish this the latch 92 is provided with a releasing arm 104 which, as it is nearing the end of its travel, strikes, and is depressed by, a cam 105 secured on frame 1. The latch is thereby swung clear of the lug 91 which permits the arms 26 to be lowered free from the strip which is thereby deposited on the blocks 25. The shaft 94 has now made one-half revolution and the final half revolution reverses the direction of the gear-wheel-and-rack drive 93 which drives the chains 83 in the opposite direction thereby returning the arms 26 to their inactive positions.

To facilitate weighing, the platform 20 just before the strip is deposited thereon is lifted off the knife-edges upon which it is supported and is lowered upon these knife-edges as soon as the strip is deposited on the platform. This raising and lowering is accomplished by a set of posts 106 which are first raised to bring them into contact with the platform thereby raising the platform free from its knife-edges and are then lowered to bring the platform again into contact with the knife-edges. The posts are secured to a yoke 107, which is raised and lowered by means of cam-wheel-and-roller control 108, the cam-wheel being mounted on cam-shaft 34 and the roller being operably connected to the yoke 107 by means of the bell-crank-rod-and-arm connection 109, the roller being directly mounted on the bell crank of this connection. The cam-wheel-and-roller control is timed in its operation to effect a raising of the platform 20 just before the strip is deposited thereon and a lowering thereof just after the strip has been deposited.

The machine has now completed a cycle of operations and all that is required is to start the conveyor belt 15 again into operation to carry another strip of material to the knives whereby all the previously described operations will be repeated. To accomplish this the clutch 42 is operated to connect its sprocket wheel to shaft 30. To effect this the clutch 42 is in operable connection with a cam-wheel-and-roller control 110 through the longitudinally slidable rod-and-clutch connection 55, the rod being connected to an arm 111 to which the roller of control 110 is secured, the cam-wheel being mounted on cam shaft 34 and timed in its operation to effect a driving of the conveyor belt as soon as the arms 26 have returned to their inactive position.

Having thus described our invention what we claim and desire to protect by Letters Patent is:

1. In a machine of the class described, means for feeding a strip, spaced means for cutting the strip at two points, means for laterally discharging the cut strip, and means governed by the strip for operating each of said previously named means.

2. In a machine of the class described, means for feeding a strip, spaced means for cutting the strip at two points, means for first lifting and then laterally transferring the cut strip, and means governed by the strip for operating each of said previously named means.

3. In a machine of the class described, means for feeding a strip, spaced means for cutting the strip at two points, means for lifting, laterally transferring and lowering the cut strip, and means governed by the strip for operating each of said previously named means.

4. In a machine of the class described, means for feeding a strip, spaced means for cutting the strip at two points, a scale pan, means for transferring the cut strip to the scale pan, means for raising the pan from its bearings prior to depositing the strip thereon, and means governed by the strip for operating each of said previously named means.

5. In a machine of the class described, means for feeding a strip, spaced means for cutting the strip at two points, a scale pan, means for lifting, transferring and lowering the strip on the pan, means for elevating the pan prior to depositing the strip thereon, and means governed by the strip for operating each of said previously named means.

6. In a machine of the class described, a conveyor for feeding a strip, spaced parallel inclined knives for skive cutting the strip at two points, means for raising and holding the knives in inoperative position, means for releasing them, and means co-operating with said conveyor and the strip for governing the action of each of the previously named parts.

7. In a machine of the class described, reciprocating knives, a conveyor belt for feeding strip material to said knives, means for operating the knives to cut the strip, means for diverting the conveyor belt to form gaps in the upper run thereof, and means for removing the strip from the belt after it has been cut including reciprocating arms disposed in said gaps when in inactive positions.

8. In a machine of the class described, a support for a strip of material, spaced cutters disposed above the support when in inactive positions, means for lowering the cutters to cut the strip entirely across at two places to thereby produce a piece therebetween of a predetermined length and of the entire width of the strip, and intermittently operated means for conveying the cut strip from the support to a weighing scale.

9. In a machine of the class described, a pair of spaced reciprocating knives, a conveyor belt beneath the knives for feeding the strip material to said knives, means for diverting the conveyor belt to form gaps in the upper run thereof, blocks disposed in said gaps having a shearing face adapted to coact with said knives in their cutting operations, common means for simultaneously lowering both knives to cut the strip, and means for simultaneously moving a knife, its coacting shearing block and a conveyor diverting means relative to the other knife to vary the length of the cut to be effected.

10. In a machine of the class described, reciprocating knives, a conveyor belt for feeding strip material to said knives, means for operating the knives to cut the strip, means for diverting the conveyor belt to form gaps in the upper run thereof, means for removing the strip from the belt after it has been cut including reciprocating arms disposed in said gaps when in inactive positions, and means for moving a knife, certain of the reciprocating arms and the conveyor diverting means forming the gaps therefor relative to the other knife, certain other of the reciprocating arms and the conveyor diverting means forming the gaps therefor for varying the length of cut to be effected.

11. In a machine of the class described, a conveyor belt for feeding strip material, means for trimming the ends of the strip, means for operating the trimming means, and means cooperating with the belt and strip for controlling said operating means.

12. In a machine of the class described, a conveyor belt for feeding strip material, means for driving the belt, means for stopping the belt, means for cutting the strip, means for operating the cutting means, and a common means co-operating with the belt and strip for controlling said stopping and operating means.

13. In a machine of the class described, a conveyor belt for feeding strip material, means for driving the belt, means for stopping the belt, means for cutting the strip, and means cooperating with the belt and strip for controlling said operations.

14. In a machine of the class described, means for supporting strip material, means for operating on the strip, a weighing scale, means for conveying the strip from the support to the scale pan of the weighing scale after it has been operated upon, and means for raising the scale pan from its bearings prior to depositing a strip thereon.

15. In a machine of the class described, a conveyor belt for feeding strip material, means for cutting the strip, means for timing various operations including a shaft, and means co-operating with said belt and the strip for controlling the operation of said shaft.

16. In a machine of the class described, a conveyor belt for feeding strip material, means for driving the belt, means for stopping the belt, means for cutting the strip, means for timing the various operations including a shaft, and means cooperating with said belt and the strip for controlling the operations of said shaft and said belt stopping means.

17. In a machine of the class described, means for supporting strip material, means for operating on the strip, a weighing scale, means for conveying the platform of the strip from the support to the platform of a weighing scale after it has been operated upon, and auxiliary means for temporarily supporting the platform of the scale while the strip is being placed thereon.

18. In a machine of the class described, a conveyor belt for feeding strip material, a pair of guillotine knives above the belt, means for driving the belt, means for stopping the belt when the strip has been fed between the knives, means for dropping the knives to cut the strip, means for raising the knives after they have cut the strip, and means governed by the strip and belt for transferring the cut strip from the belt to a scale.

19. In a machine of the class described, a conveyor belt for feeding strip material, a pair of inclined guillotine knives above the belt, means for lowering the knives to cut the strip, means for raising the knives after they have cut the strip, means for transferring the cut strip from the belt to a weighing scale, means for controlling the operation of each of the previously mentioned means comprising a shaft and a series of cams mounted thereon, and means cooperating with said belt and strip to control the shaft.

Signed at Detroit, county of Wayne, and State of Michigan, this 9th day of September, 1923.

ADRIAN O. ABBOTT, Jr.

Signed at Detroit, county of Wayne, and State of Michigan, this 9th day of September, 1923.

CHERI M. SLOMAN.